June 12, 1956     C. A. KESSLER ET AL     2,749,865
SEWING MACHINE BED-SHAFT BEARING LUBRICATION
Filed June 1, 1953
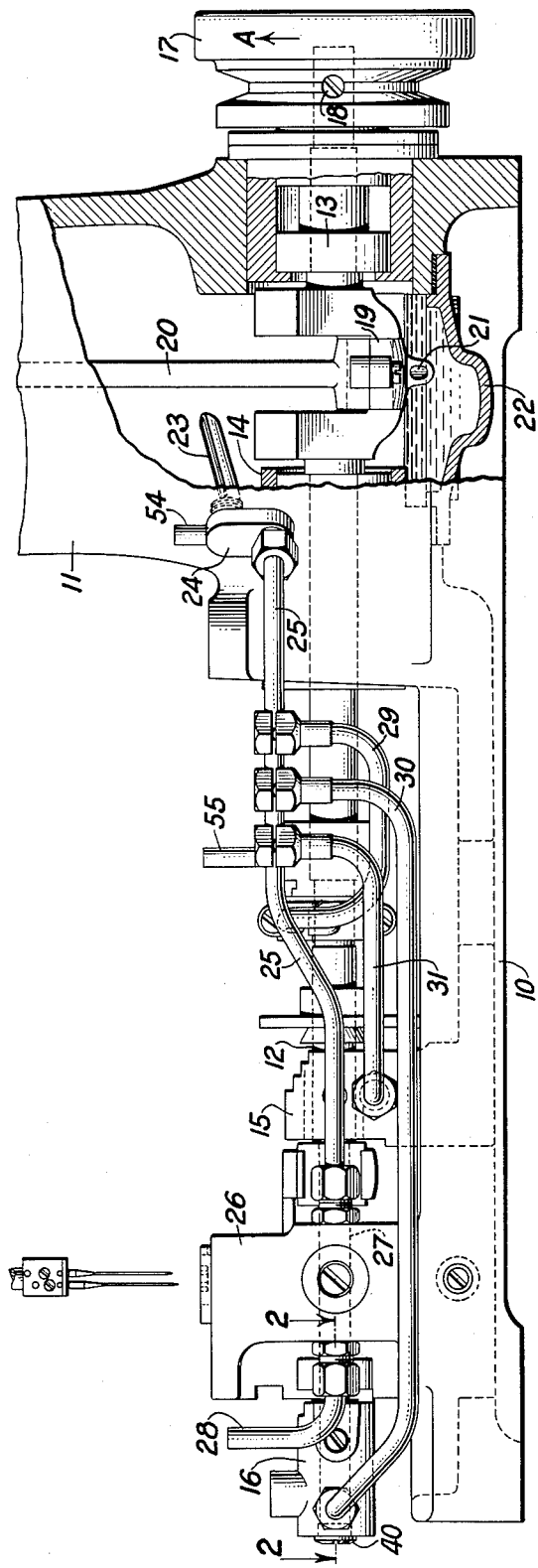
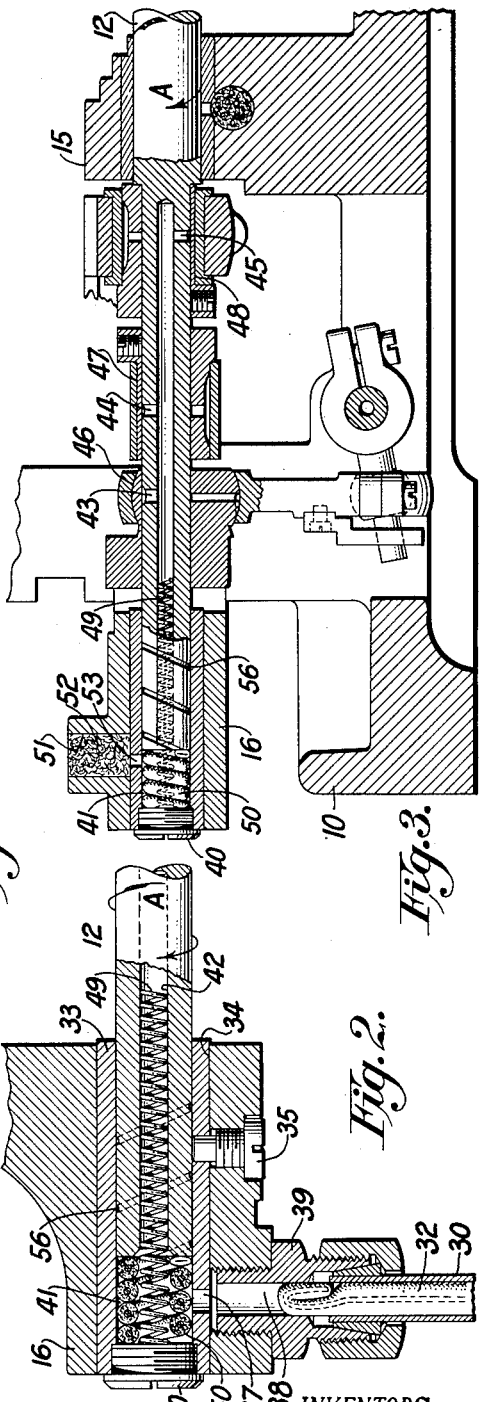
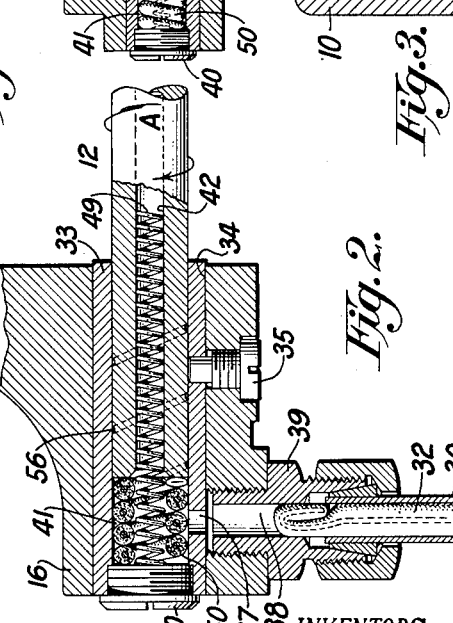
INVENTORS
Charles A. Kessler
Herman Ritter
BY United States Patent Office 2,749,865
Patented June 12, 1956

2,749,865

SEWING MACHINE BED-SHAFT BEARING LUBRICATION

Charles A. Kessler, Plainfield, and Herman Ritter, Cranford, N. J., assignors to The Singer Manufacturing Company, Elizabeth, N. J., a corporation of New Jersey Application June 1, 1953, Serial No. 358,916

4 Claims. (Cl. 112—256)

This invention relates to sewing machines designed to operate at high speeds and more particularly relates to the lubrication of the bearings carried by a high speed sewing machine bed-shaft.

It is an object of this invention to provide an effective lubricating system for a high speed sewing machine.

It is a further object of the invention to provide means for supplying lubricant to the bearings of a high speed bed-shaft.

With the above and other objects in view, the invention comprises the devices, combinations and arrangements of parts hereinafter set forth and illustrated in the accompanying drawings of a preferred embodiment of the invention and the advantages attained thereby will be readily apparent to those skilled in the art.

In the accompanying drawings,

Fig. 1 is a front elevational view, partly broken away, of a sewing machine bed embodying the invention.

Fig. 2 is an enlarged horizontal sectional view of the bed-shaft end bearing and support taken substantially through the center of the bed-shaft on the line 2—2.

Fig. 3 is an enlarged vertical sectional view of the mechanism actuating end of the bed-shaft taken substantially through the center of the bed-shaft showing the lubricating passages.

Referring more particularly to the drawings, a sewing machine bed 10 is shown which carries a bracket-arm 11. A bed-shaft 12 is rotably supported by the bed 10 in four bearings 13, 14, 15 and 16, and drives sewing mechanisms of a well-known type, such as shown in the Muecke U. S. Patent No. 2,350,965, dated June 6, 1944. The sewing mechanisms, per se, form no part of this invention but reference to the Muecke patent is believed to make their relation to the bed-shaft 12 perfectly clear. A driving pulley 17 secured to one end of the bed-shaft 12 by a set-screw 18 is adapted to be rotated by a source of power (not shown). A crank 19 formed on the bed-shaft 12 actuates a connecting rod 20 which drives a conventional upper rock-shaft mechanism (not shown) similar to the mechanism shown in the said Muecke patent. A lubricant splasher 21 is provided on the lower end of the connecting rod 20 which dips into lubricant, such as oil, carried in a sump 22 beneath the bed-shaft crank 19 and provides a spray of lubricant within the arm 11. A lubricant-collecting trough 23 extends through the wall of the bracket-arm 11 and enters a lubricant fitting 24 from which a main lubricant distributor tube 25 extends. The main tube 25 terminates in a bearing block 26 provided with a lubricant passage 27 which is vented by a priming tube 28. Three additional lubricant feed tubes 29, 30 and 31 are supplied with lubricant from the main tube 25 for lubricating other bearings along the bed-shaft 12. The feed tube 30 carries lubricating oil from the main tube 25 to the bearing 16 which carries one end of the bed-shaft 12. As shown in Fig. 2, a wick 32 placed in the end of the tube 30 meters the flow of lubricant from the tube 30. A bearing bushing 33 is fitted into a bore 34 in the bearing 16 and is held in place by a set screw 35 threaded into the bearing 16 and entering a positioning hole 36 formed in the bushing 33. A radial hole 37 in the bushing 33 is alined with a lubricant inlet hole 38 in a fitting 39 which secures the tube 30 to the bearing 16. The bed-shaft 12 does not extend the full length of the bushing 33 but stops short of the end of the bushing by a substantial amount. A closure plug 40 is threaded into the end of the bushing 33. The plug 40 seals the end of the bushing 33, forming a lubricant chamber 41 at the end of the bed-shaft 12. As shown in Figs. 2 and 3, the end of the bed-shaft 12 adjacent to the bearing 16 is provided with an axial bore 42 which extends substantially to the bearing 15. Lubricant supplied to the lubricant chamber 41 at the end of the bed-shaft 12 flows through the axial bore 42 and thence through radial holes 43, 44 and 45 formed in the bed-shaft 12 to bearings 46, 47 and 48 carried by the bed-shaft 12. An open-centered coil spring 49 of substantially the same diameter as the bore 42 is securely fastened to the closure plug 40 and extends into the bore 42 a considerable distance. Wicking 50 is coiled around the spring 49 to partially fill the lubricant chamber 41. A lubricant priming hole 51 filled with wicking 52 is formed in the top of the bearing 16 and is connected to the lubricant chamber 41 by a hole 53 formed in the bushing 33. It should be noted that additional lubricant priming tubes 54 and 55 are provided on the lubricant fitting 24 and at the supply fitting for the tube 31, respectively. These priming tubes 28, 54 and 55 also function as escape points for air which may enter the system. A lubricant return helical groove 56 is formed in the outer surface of the shaft 12 within the bushing 33.

From the foregoing description, it is believed that the operation of the device will be readily understood. In prior devices, it is old to attempt to supply lubricant to bearings carried by a rotating shaft by means of a central bore and radial holes in the shaft. However, in devices of this type, it is sometimes difficult to obtain a sufficient and constant lubricant flow into the axial bore without supplying lubricant to the bore under pressure. The applicant, by the use of the helical spring 49 and the helical groove 56, has provided a lubricating system of this type which does not require pressure. Before the sewing machine is placed in operation, the lubricant lines are primed by placing a few drops of lubricant in each of the priming tubes 28, 54 and 55 and the hole 51 to assure that each of the bearings is initially supplied with lubricant. Upon energizing the power source (not shown) for the machine, the pulley 17 and bed-shaft 12 are rotated in the direction of the arrow A, or counterclockwise as viewed from the right end of Fig. 1. When the bed-shaft 12 begins to rotate, the lubricant splasher 21 dips into the lubricant held in the sump 22 and distributes a mist of lubricant within the bracket-arm 11. A certain quantity of lubricant collects in the trough 23 and flows into the fitting 24 which supplies the main distributing tube 25. Lubricant filling the tube 30 is metered into the lubricant chamber 41 through the wicking 32 inserted in the end of the tube 30. The wicking 50 coiled around the spring 49 in the chamber 41 partially fills the chamber and causes lubricant to run into the open end of the central bore 42. As the lubricant enters the bore 42 of the rotating bed-shaft 12, the friction between the bore surface and the lubricant causes the lubricant to rotate with the bed-shaft 12. Centrifugal force causes a thin layer of lubricant to form on the surface of the bore 42, and this thin layer of lubricant rotates with the bed-shaft 12 at substantially the same speed. As the layer of lubricant moves, it encounters the helical coils of the stationary spring 49. The coil-spring 49 functions as a feed screw pump for the lubricant which rotates with the bed-shaft 12 and, since the spring 49 is wound in a direction opposite to the rotation of the bed-shaft 12, lubricant is fed into the bore 42 and thence through the radial holes 43, 44 and 45 to the bearings 46, 47 and 48. The coaction of the coil-spring 49 and the rotating bed-shaft 12 causes only the required limited quantity of lubricant to be supplied to the bearings 46, 47 and 48, since only a layer of lubricant which is substantially as thick as the wire from which the spring 49 is formed is moved axially along the bore 42. If the layer of lubricant is thicker than the thickness of the wire from which the coil-spring 49 is formed, the excess lubricant merely passes over the coils but does not move axially of the bed-shaft 12. Thus, an excessive quantity of lubricant cannot be supplied to the bearing 46, 47 and 48. The spiral groove 56 in the outer surface of the bed-shaft 12 prevents excessive leakage of lubricant from the bushing 33. This groove 56 forms a pump which carries excess lubricant back to the lubricant chamber 41, preventing excessive lubricant leakage from the bushing 33 and the resulting stains on material being sewn on the machine.

From the above description, it is believed to be apparent that the applicant has devised an improved means for supplying lubricant to a lubricant distributing bore in a rotating shaft. Of course, it is to be understood that the lubricant means is not limited to a horizontal shaft but functions equally well with all of the same advantages when the shaft is in other positions.

Having thus set forth the nature of the invention, what we claim herein is:

1. In a sewing machine having a frame and shaft bearings carried by said frame; a shaft rotatably journaled in said bearings and formed with a longitudinal bore; bearings carried by said shaft; said shaft being provided with a radial lubrication hole within one of said last mentioned bearings; an open-centered, stationary coil-spring extending into the bore in said shaft; means fixing said spring to said frame to maintain said spring fixed against rotation within said bore when the shaft is rotated; and means for supplying lubricant to said shaft bore at a location adjacent said spring; said coil-spring working in close proximity to the inner surface of said hollow shaft to cause lubricant supplied to the end of said shaft to travel along said bore.

2. A sewing machine having a frame, shaft supporting bearings carried by said frame; a rotatable shaft journaled in said bearings and formed with a longitudinal bore; said shaft being provided with radially extending holes which communicate with said bore; a lubricant chamber located at one end of said shaft; means for supplying lubricant to said chamber, a coil spring extending through said chamber and into the bore of said shaft; said spring having coils in close proximity to the interior wall of said hollow shaft for causing lubricant to flow along the bore in said shaft when said shaft is rotated; and means fixing said spring to said frame to maintain said spring fixed against rotation within said bore when the shaft is rotated.

3. A sewing machine having a frame; drive shaft supporting bearings carried by said frame; a drive shaft journaled in said bearings and normally rotatable in one direction; said shaft having an axially extending central bore; a lubricant chamber at one end of said shaft; an open-centered, cylindrical coil-spring extending through said chamber and into said bore; said spring being wound in a direction opposite to the direction of the normal rotation of said shaft; and means fixing said spring to said frame to maintain said spring fixed against rotation within said bore when the shaft is rotated.

4. In a sewing machine having a frame and a work-support; support bearings carried by said frame; a hollow shaft journaled on said bearings and normally rotatable in one direction; an eccentric carried by said shaft and having a bearing surface; a lubricant passage extending from the hollow portion of said shaft to a bearing surface on said eccentric; a lubricant chamber at one end of said shaft; means for supplying lubricant to said chamber; an open-centered coil-spring extending through said chamber into said hollow shaft; said spring being wound in a direction opposite to the normal direction of rotation of said shaft and having coils in close proximity to the inner surface of said hollow shaft; and means fixing said spring to said frame to maintain said spring fixed against rotation within said bore when the shaft is rotated.

References Cited in the file of this patent

UNITED STATES PATENTS

| | | |
|---|---|---|
| 1,081,841 | Korytynski | Dec. 16, 1913 |
| 1,767,153 | Pfaff et al. | June 24, 1930 |
| 2,125,917 | Hanna | Aug. 9, 1938 |
| 2,385,288 | Vesconte et al. | Sept. 18, 1945 |
| 2,502,346 | Sauer | Mar. 28, 1950 |
| 2,530,860 | Christensen et al. | Nov. 21, 1950 |